United States Patent [19]

Gutshall

[11] 4,144,795

[45] Mar. 20, 1979

[54] LONG-PITCH RE-ROLLED CREST THREAD

[76] Inventor: Charles E. Gutshall, 2911 E. State St., Rockford, Ill. 61108

[21] Appl. No.: 843,720

[22] Filed: Oct. 20, 1977

[51] Int. Cl.² ............................................. F16B 23/00
[52] U.S. Cl. ............................................. 85/48; 85/44
[58] Field of Search ................................ 85/46, 48, 44

[56] References Cited

U.S. PATENT DOCUMENTS

| 138,592 | 5/1873 | Stockton | 85/44 |
|---|---|---|---|
| 410,698 | 9/1889 | Rogers | 85/44 |
| 2,183,243 | 12/1939 | Meersteiner | 85/44 |
| 3,207,023 | 9/1965 | Knohl | 85/46 |
| 3,865,006 | 2/1975 | Massoney | 85/44 |

FOREIGN PATENT DOCUMENTS 12415 of 1889 United Kingdom .................... 85/44

*Primary Examiner*—Roy D. Frazier
*Assistant Examiner*—Peter A. Aschenbrenner
*Attorney, Agent, or Firm*—Merriam, Marshall & Bicknell

[57] ABSTRACT

A threaded fastener incorporates a long-pitch helical thread rolled on a cylindrical blank of predetermined diameter, leaving untouched a section of the blank between adjacent turns or convolutions of the thread. The thread has a crest which is greater in diameter than the blank and a root which is smaller in diameter than the blank. The contour of the thread in a plane including the longitudinal axis of the screw is unsymmetrical about a line perpendicular to the axis and passing through the crest, the flank of the crest facing the head end of the screw being more nearly perpendicular to the axis than the flank facing the work-entering end of the screw. At each juncture between the root of the thread and the adjacent untouched blank sections, there is an outwardly extending helical bur or crest which functions as an auxiliary thread to improve the holding power of the screw.

5 Claims, 4 Drawing Figures

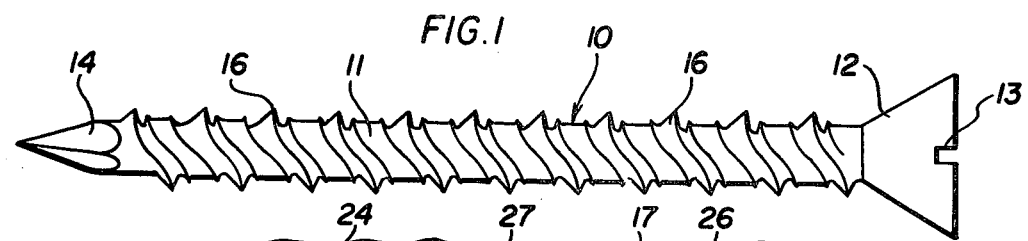
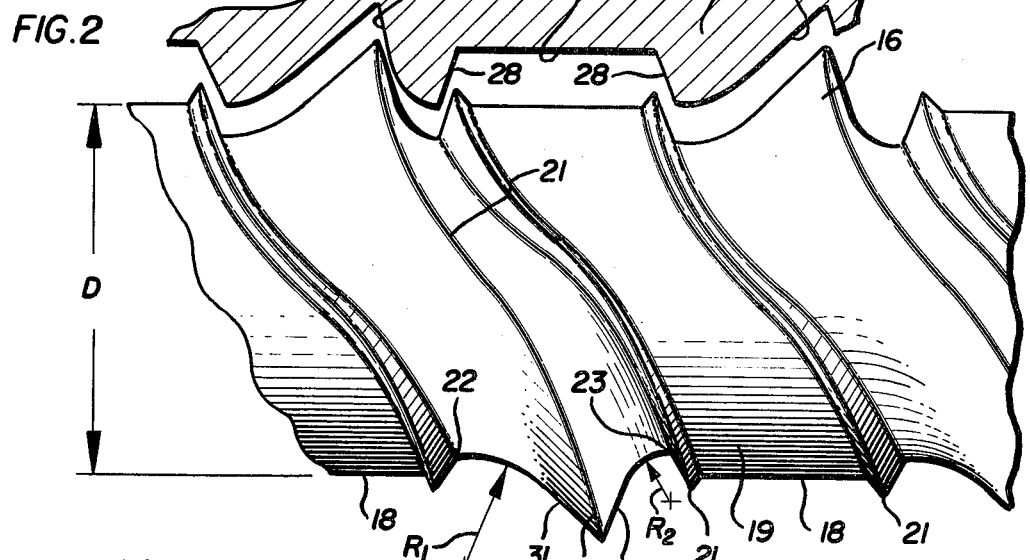
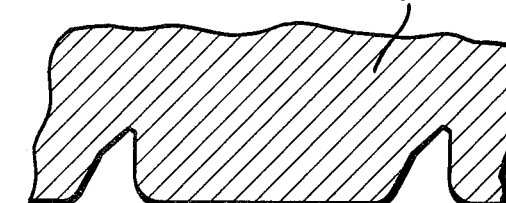
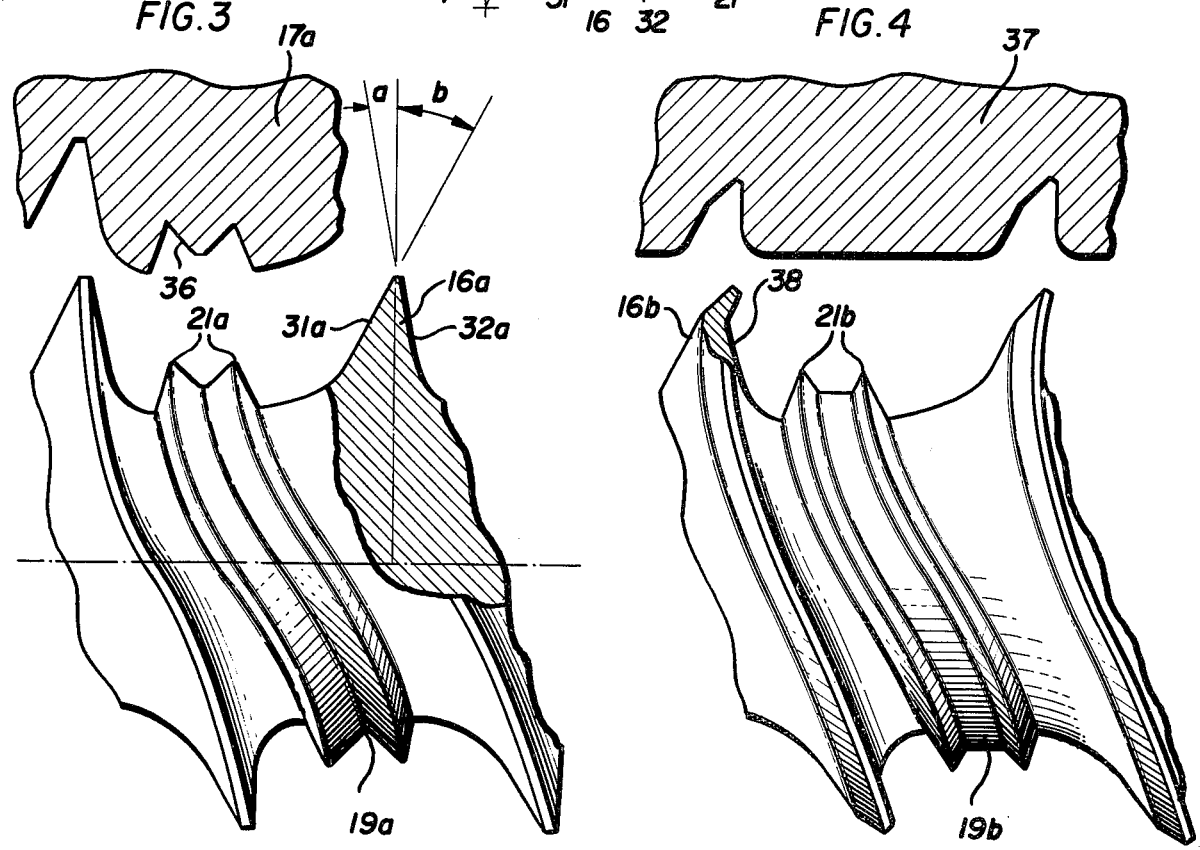
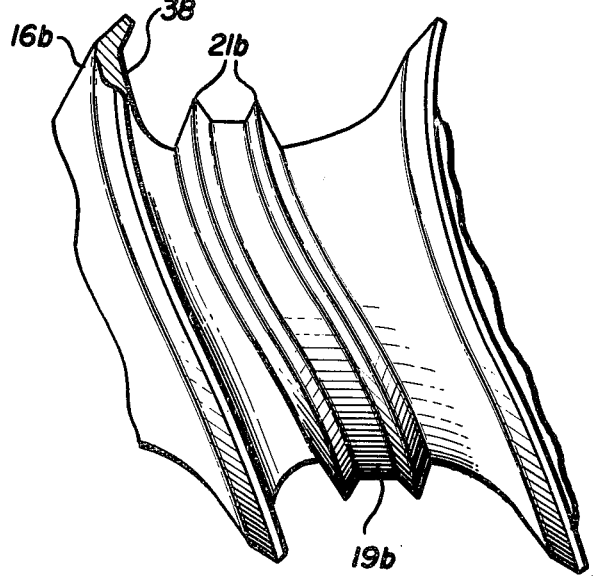

LONG-PITCH RE-ROLLED CREST THREAD

This invention relates to a threaded fastener provided with a coarse thread having a contour designed to increase the holding power of the thread in soft, fibrous or low-density materials such as wood and plastics.

BACKGROUND OF THE INVENTION

It is known that the holding power of a threaded fastener, such as a screw, in soft, fibrous or low-density materials such as wood or plastics can be increased by providing a relatively coarse thread. In this manner, the number of points where the workpiece is cut by the thread of the screw is reduced, thereby increasing the resistance to shear of the material of the workpiece between adjacent convolutions of the thread. As the thread pitch is increased, however, the thread strength of the fastener is decreased, since the increased length of the fastener shank between adjacent threads does not contribute to the holding power of the fastener except as a result of frictional engagement with the workpiece.

Several previous efforts to design a threaded fastener for use in soft materials, as exemplified by U.S. Pat. Nos. 410,698 and 3,207,023, have provided a second helical thread or rib of substantially less height than the primary thread, with the convolutions of the secondary thread or rib located between the convolutions of the primary thread. Although these designs have improved the holding power of the screws, they still have certain shortcomings.

In U.S. Pat. No. 410,698, a relatively wide, flat or convex, helical rib is provided between adjacent turns of the main thread. If such a screw is inserted in a pilot hole having a diameter corresponding approximately to the diameter of the auxiliary rib, the holding power of the screw is only slightly increased, since only the frictional force between the workpiece and the outer surface of the rib contributes to the holding power of the screw. If, on the other hand, the screw is inserted into a pilot hole of smaller diameter so as to force the rib into contact with the walls of the workpiece, thereby compressing the workpiece, the driving torque of the screw is increased, and in addition there is an increased likelihood of splitting the workpiece because of the radial force exerted by the screw.

With respect to the screw shown in U.S. Pat. No. 3,207,023, the manufacture thereof presents certain operating difficulties during the thread rolling operation used to make the screw. Because of axial conflicting forces present in such operation, the screw blank tends to become elongated, thereby requiring in certain instances the use of blanks of different diameters to produce different lengths of screws having the same nominal diameter. Further, the fabrication of the screws in conventional thread-rolling equipment produces poorly finished large diameter thread crests at both ends of the threaded portion.

SUMMARY OF THE INVENTION

In accordance with the present invention, there is provided an improved threaded fastener or screw having an extra coarse thread which achieves great holding power in soft, fibrous or low-density materials and which can be roll-formed from a cylindrical blank of a uniform predetermined diameter, regardless of the screw length. In addition to its great holding power, the screw of the invention is designed to reduce the angle of holding force exerted by tightening the threads in a workpiece to a direction more nearly parallel to the axis of the screw, thereby reducing the likelihood of radial fractures of a workpiece in which the screw is tightened.

The screw of the invention is characterized by a helical thread rolled from a cylindrical blank of predetermined diameter, leaving untouched a section of the blank between adjacent turns or convolutions of the thread. The thread so formed has a crest which is greater in diameter than the blank and a root which is smaller in diameter than the blank. The contour of the thread in a plane including the longitudinal axis of the screw is unsymmetrical about a line perpendicular to the axis and passing through the crest, the flank of the crest facing the head end of the screw being more nearly perpendicular to the axis than the flank facing the work-entering end of the screw. At each juncture between the root of the thread and the adjacent untouched blank sections, there is an outwardly extending helical bur or crest which functions as an auxiliary thread to improve the holding power of the screw. In a preferred embodiment, the outer portion of the main thread, including the crest thereof, is bent or inclined toward the head end of the screw, causing the flank facing the head end to be generally concave in form, thereby further decreasing the holding force angle and increasing the holding power of the screw while minimizing any radial or outwardly extending forces which might tend to split a workpiece.

DESCRIPTION OF THE DRAWINGS

The invention will be better understood from the following detailed description thereof, taken in conjunction with the accompanying drawings, in which:

FIG. 1 is a side view of a screw representing a typical embodiment of the present invention;

FIG. 2 is an enlarged view of a portion of the screw of FIG. 1, showing also in cross-section a portion of a suitable die for rolling the threads of the screw;

FIG. 3 is an enlarged section of another embodiment of the invention, showing also a sectional view of a die suitable for rolling the threads; and FIG. 4 is an enlarged detail of a still further embodiment of the invention showing also a cross-sectional view of a die suitable for inclining the crests of the threads toward the head end of the screw.

DETAILED DESCRIPTION

As shown in the drawings, in a typical embodiment the fastener of the invention comprises a screw 10 having an elongated shank 11, to one end of which is attached a conventional head 12 provided with means, such as slot 13, for driving the screw in conventional fashion. The opposite or work-entering end 14 of the screw is preferably pointed for facilitating entry into a pilot hole in a workpiece. Shank 11 is provided with a helical thread 16 which makes a number of convolutions along the length thereof.

Screw 10 is formed by a conventional rolling operation employing a die 17, a portion of which is shown in cross-section, from a cylindrical blank having a predetermined diameter D, as shown in FIG. 2. Die 17 is so constructed that during the rolling operation which produces thread 16, a section 18 of the blank between the adjacent convolutions of thread 16 remains untouched by the die. It will be seen that section 18 has a helical outer surface 19 having a diameter D, corresponding to the diameter of the blank from which the screw is formed.

The helical thread 16 produced by die 17 has a crest 21 with a diameter larger than D and twin roots 22, 23 having a diameter smaller than D. Between adjacent thread-forming sections, e.g., 24, 26, die 17 is provided with a groove 27 having a depth greater than the radial distance between roots 22 or 23 of thread 16 and the outer face 19 of the blank from which the screw is formed. Accordingly, during the rolling operation, section 18 between adjacent turns of thread is radially unconfined by contact with the die. Groove 27 in die 17 is provided with sloping sidewalls 28 inclined at a suitable angle, typically 15°, which permits the metal or other material of which the screw is formed to flow outwardly beyond blank surface 19, thereby producing a helical crest or bur 28 located at the juncture between surface 19 and the roots 22, 23 of thread 16. When screw 10 is inserted into a pilot hole having a diameter D in a workpiece, crests 29 engage the walls of the pilot hole thereby increasing the pull-out resistance of the screw.

In accordance with the invention, the contour of thread 16 in the vicinity of the root section thereof, is circular, being defined by arcs of circles having raddi $R_1$ and $R_2$, both of which are tangent to the minor diameter of the thread at points 22 and 23 respectively, while at the other ends the arcs are tangent to the flanks 31, 32 which define the crest 21 of thread 16. Radius $R_1$ is suitably five times the radial distance between roots 22, 23 and blank surface 19, while $R_2$ is suitably three times this distance, or 60% of $R_1$. The circular sections 33 and 34 of die 17 which produce the root contour of thread 16 cause the blank material to roll smoothly from the blank during roll-forming to permit the crest 21 of thread 16 to be formed smoothly with few slivers or other irregularities.

The pitch of thread 16 in screw 10 can be controlled by adjusting the width of blank surface 19 between adjacent convolutions of the thread. In FIG. 3, which represents a limiting case, blank surface 19a has been reduced to a vestigial width such that crests 21a are adjacent each other. In such instance, it may be desirable to provide die 17a (FIG. 3) with a suitably shaped ridge 36 to aid in maintaining the integrity of each of the crests.

As shown in the drawings, e.g., FIG. 3, thread 16a has a contour which is unsymmetrical, in a plane including the longitudinal axis of the screw, about a line perpendicular to the axis passing through the crest of the thread. The flank 32a of thread 16a facing the head end 13 of the screw is more nearly perpendicular to the axis of the screw than is the flank 31a facing the work-entering end of the screw. In other words, angle $b$ is greater than angle $a$ (FIG. 3). In a typical embodiment, angle $a$ is preferably about 15° while angle $b$ is about 30°, whereby the included crest angle of the thread 16a is about 45°. The more nearly vertical flank 32a of thread 16a causes the angle of holding force exerted by tightening the screw in a workpiece to be more nearly parallel to the axis of the screw, thereby reducing the radial forces exerted by the screw on a workpiece. For example, in the preferred embodiment wherein angle $a$ is 15°, the angle of work force is also 15°. By comparison, in a screw thread having a symmetrical crest with an included angle of 45°, the work force angle is 22.5° and includes a radial force component which is double that exerted by the preferred embodiment of the screw of the invention.

In FIG. 4, there is depicted a further embodiment of the invention in which blank surface 19b between adjacent crests 21b has a width intermediate that shown in FIGS. 2 and 3. The embodiment of FIG. 4 has been further modified by a second rolling operation employing die 37, the effect of which is to incline the preformed crest portion of thread 16b in a direction toward the head end of the screw. Die 37 is suitably fashioned such that the inclined portion of the thread represents about 25 to 30% of the total root-to-crest dimension. It will be seen that by inclining the crest of the thread, the flank 38 thereof facing the head end of the screw assumes a concave configuration, further decreasing the angle of force exerted by thread when the screw is tightened. Accordingly, when the screw is tightened, the material adjacent the concave surface of the thread is compressed axially, thereby achieving great holding strength while minimizing the radial forces which might tend to crack a workpiece in which the screw is inserted.

Any degree of inclination of the crest portion of thread 16b towards the head end of the screw will improve the holding power thereof without increasing the radial force exerted thereby, in accordance with the invention. It is preferred, however, that the crest of thread 16b be inclined at an angle of about 10° to 25° from the perpendicular to the axis of the screw.

The foregoing detailed description has been given for clearness of understanding only, and no unnecessary limitations should be understood therefrom as modifications will be obvious to those skilled in the art.

What is claimed is:

1. A rolled screw formed from an elongated cylindrical blank of predetermined diameter, said screw comprising:
    an elongated shank having a work-entering end and a head end;
    a helical thread on said shank, the crest diameter of said thread being larger than the diameter of said blank and the root diameter of said thread being smaller than the diameter of said blank;
    said helical thread having an unsymmetrical contour in a plane including the longitudinal axis of said screw, the flank of said thread facing the head end of said screw being more nearly perpendicular to the axis thereof than the flank facing said work-entering end;
    said shank having a helical surface separating adjacent turns of said helical thread, said helical surface having a diameter substantially equal to that of said blank; and
    helical crests located at the juncture between said helical surface and said threads adjacent thereto, said crests extending radially outwardly beyond said helical surface.
2. The screw of claim 1 wherein the outer portion of said thread including the crest thereof is inclined toward said head end, whereby the flank of said thread facing said head end is substantially concave.
3. The screw of claim 2 wherein said outer portion of said thread is inclined toward said head end at an angle of about 10°–25° from a line perpendicular to the axis of said screw.
4. The screw of claim 3 wherein said outer portion represents about 25–30% of the radial crest-to-root dimension of said thread.
5. The screw of claim 2 wherein the contour of the flanks of said thread is defined in part by circular arcs at the roots thereof, the arc defining the root of the flank facing the head of said screw being smaller in radius than the arc defining the root flank facing the work-entering end thereof.

* * * * *